(12) United States Patent
Lee

(10) Patent No.: US 12,148,085 B2
(45) Date of Patent: Nov. 19, 2024

(54) METHODS AND SYSTEMS FOR GRAPHICS TEXTURING AND RENDERING

(71) Applicant: Charles Chungyohl Lee, Roseville, CA (US)

(72) Inventor: Charles Chungyohl Lee, Roseville, CA (US)

(*) Notice: Subject to any disclaimer, the term of this patent is extended or adjusted under 35 U.S.C. 154(b) by 53 days.

(21) Appl. No.: 17/971,982

(22) Filed: Oct. 24, 2022

(65) Prior Publication Data

US 2023/0128982 A1 Apr. 27, 2023

Related U.S. Application Data

(60) Provisional application No. 63/270,780, filed on Oct. 22, 2021.

(51) Int. Cl.
| | | |
|---|---|---|
| *G06T 15/50* | (2011.01) | |
| *G06T 3/4053* | (2024.01) | |
| *G06T 15/04* | (2011.01) | |
| *G06T 15/80* | (2011.01) | |
| *H04N 19/186* | (2014.01) | |

(52) U.S. Cl.
CPC ............ *G06T 15/04* (2013.01); *G06T 3/4053* (2013.01); *G06T 15/503* (2013.01); *G06T 15/80* (2013.01); *H04N 19/186* (2014.11); *G09G 2340/06* (2013.01)

(58) Field of Classification Search
None
See application file for complete search history.

(56) References Cited

U.S. PATENT DOCUMENTS

| | | | | |
|---|---|---|---|---|
| 8,542,265 | B1* | 9/2013 | Dodd | H04N 7/15 |
| | | | | 348/14.08 |
| 2002/0126117 | A1* | 9/2002 | Grzeszczuk | G06T 15/50 |
| | | | | 345/419 |
| 2004/0005077 | A1* | 1/2004 | Bilobrov | H04N 19/61 |
| | | | | 375/E7.189 |
| 2008/0143739 | A1* | 6/2008 | Harris | G09G 5/377 |
| | | | | 345/604 |
| 2016/0307482 | A1* | 10/2016 | Huang | G09G 5/397 |
| 2020/0214102 | A1* | 7/2020 | Lamanna | H04N 23/72 |
| 2021/0029335 | A1* | 1/2021 | Butters | H04N 9/69 |
| 2021/0314564 | A1* | 10/2021 | Zeng | H04N 19/593 |
| 2022/0387886 | A1* | 12/2022 | Weising | A63F 13/77 |

* cited by examiner

*Primary Examiner* — Joni Hsu
(74) *Attorney, Agent, or Firm* — Pierson IP, PLLC

(57) ABSTRACT

Examples of the present disclosure relate to techniques for new algorithms for 3D graphics texturing and rendering. More specifically, embodiments relate to "Chroma Fract Rendering" (referred to as CF) that take advantage of the relative insensitivity of the human eye-brain systems for chrominance versus luminance, to reduce the macro-sized bandwidth and overall calculation requirements.

17 Claims, 10 Drawing Sheets

Trilinear Filtering in a Mexel Map

Trilinear Filtering in a Mip Map

METHODS AND SYSTEMS FOR GRAPHICS TEXTURING AND RENDERING

BACKGROUND INFORMATION

Field of the Disclosure

Examples of the present disclosure relate to techniques for new algorithms for 3D graphics texturing and rendering. More specifically, embodiments relate to "Chroma Fract Rendering" (referred to herein after as CF) that take advantage of the relative insensitivity of the human eye-brain systems for chrominance (or "chroma") versus luminance (or "luma") to reduce the macroscopic-sized bandwidth and overall calculation requirements.

BACKGROUND

A graphics processing unit (GPU) is a specialized electronic circuit designed to rapidly manipulate and alter computer memory to accelerate the creation of images in a frame buffer intended for output to a display device. Modern graphics processing units do enormous amounts of calculation while repeatedly accessing memory in order to render 3D graphics. The number of gates (units of digital electronic circuitry) typically double with each generation of very large-scale integration (VLSI) chip technology. Also, these gates tend to get smaller and require less power, so doubling internal calculations or internal memory accesses does not double the power. As such, GPU technology scales up well with VLSI technology. However, each new generation of VLSI technology is expensive when first being introduced, and many form factors for designs (such as for light laptops and tablets) impose severe restrictions to decrease power usage. As such, the amount of internal circuitry inside a GPU chip is still expensive in terms of cost. Also, even if the internal circuitry scales up well with new VLSI technology, external bandwidths can limit practical GPU performance severely.

In particular, external memory bandwidth typically does not scale well because in order to widen the bit width, extra pins on the very large scale integration chips and extra wires on the circuit boards are necessary. Adding these extra wires and pins are not economical nor efficient. As such, a critical limiting factor for modern GPU performance is external memory bandwidth. GPU's need to read and write memory at huge bandwidths, and each time this is done in external memory, such as a framebuffer memory, macro-sized (i.e., macroscopic or real-world-object sized, as opposed to the incredibly tinier microscopic-sized) capacitances associated with the digital circuitry is changed. This results in a much slower and much more power-hungry access, compared to any on-chip (which are microscopic-sized) memory accesses, or calculations. Thus, it is difficult to increase memory bandwidth economically without dramatically increasing the power for the newer generations of GPUs.

Physically Based Rendering (PBR) is a computer graphics approach that seeks to render images in a way that models the flow of light in the real world. Feasible and quick approximations of the bidirectional reflectance distribution function and rendering equations are of mathematical importance for PBR and similar computer graphics techniques that use multiple textures per pixel. However, the bulk of the performance bottlenecks in GPU rendering of 3D Graphics lies within these types of per-pixel calculations. This is because per-pixel calculations are in the innermost loop of 3D Graphics rendering. Multi-texturing techniques such as PBR have rapidly become standard in high quality 3D Graphics, such as used in modern video games. However, because multi-texturing requires both large amounts of internal calculations, as well as off-chip (macroscopic) memory bandwidth in reading multiple textures per pixel, they are very expensive in terms of GPU hardware. In the prior art, it is standard to do these per-pixel calculations in ARGB (alpha, red, green, blue) types of color spaces, where alpha is usually a value associated with transparency. Thus, it is also standard for GPUs to have internal pipelines that do these per-pixel calculations with Shader Units that handle 4 independent color values in parallel in one machine cycle. Processing 4 color values in parallel handles calculations in ARGB efficiently, using a single-instruction, multiple-data (SIMD) type of design. However, it has been proven that human eye-brain systems are much less sensitive to chrominance information in a colored image when compared to luminance information.

Accordingly, needs exist for more effective and efficient methods that reduce the macro-sized bandwidth and calculation requirements of GPUS to take advantage of the relative insensitivity of human visualization of images for chrominance versus luminance. These methods would reduce the bottlenecks typically present in GPUs for carrying out these expensive (but very popular) multi-texturing and other similarly-complex per-pixel operations.

SUMMARY

Embodiments described hereinafter are directed towards 3D graphics texturing and rendering. Embodiments are directed towards chroma fract rendering (referred to hereinafter as "CF"), which encompasses multi-resolution rendering, multiplexing of disparate parameters that are normally stored separately, and utilizing multi-texturing that share common U, V (texture coordinate) values.

Embodiments are directed towards multi-resolution rendering, where final pixel colors, and intermediate colors for texturing, lighting, etc. are rendered in a color space, such as YCrCb, that separates luminance data or information from chrominance information or data. In embodiments, chrominance data may refer to data that is associated with the color of a texture that can be detected by photoreceptors called cone cells, whereas luminance data may refer to data that is associated with the brightness or luminance of a texture that can be detected by rod cells. By separating the luminance data from the chrominance data, the resolution of the luminance data may be different from the resolution of the chrominance data without impacting the perceived rendered image quality, while minimizing bandwidth and internal calculations associated with the chrominance data. In order to more efficiently and effectively render, the chrominance data may be rendered at a lower resolution than the luminance data in order to obtain higher performance, wherein this luminance data and the lower resolution chrominance data may be rendered in parallel to each other. This higher performance generally does not result in objectionable artifacts on-screen, because of the relative insensitivity of the human eye-brain system to chrominance. In other embodiments, the luminance data may be rendered before the chrominance data. More so, embodiments are configured to store chrominance data at different resolutions than the luminance data, wherein the chrominance data may be stored at a lower resolution than the luminance data. This may cause the chrominance data to be processed at a different, lower, speed than the luminance data.

Embodiments, store PBR textures in "mexel" format, rather than the prior-art "Texel (texture pixel)" format. A mexel can be defined as a "multiplexed parameter Texel", which for PBR, multiplexes parameters disparate in the prior-art into parameters multiplexed together, in order to separate the processing into 1) high-resolution: luma and similar parameters that need the full resolution processing for good image quality and 2) low-resolution: chroma and similar parameters that can get away with quarter (or similar) resolution processing, while still maintaining good image quality.

Multiplexing of the disparate parameters of chrominance or luminance that are normally stored separately increases the efficiency. In embodiments, the multiplexing of disparate parameters is generally resolution dependent where the parameters that require higher resolution are grouped together. These may typically be parameters related to luminance (luma) or similarly require the full resolution. However, embodiments allows lower resolution parameters to be grouped together, such as parameters associated with chrominance (chroma) or similarly not requiring full resolution for good perceived quality. This novel multiplexing rearranges the prior-art GPU pipeline so parameters that need the high-resolution are rendered separately from the parameters that can live with the low-resolution. This reduces the macro-bandwidth (i.e. external memory bandwidth) requirements, as well as reduces calculations in the GPU pipelines, to very significantly increase performance for a given amount of hardware and macro-bandwidth.

Generally textures in video processing memory is stored as texture pixels, or texels, in a ARGB8888-type format, which are stored in memory as Mip Maps. Mip Maps are pyramidally-arranged data structures that are pre-calculated, optimized sequences of images, each of which is a progressively lower resolution representation of the previous sequence. One popular Physically Based Rendering (PBR) Texturing uses 3 sets of mip maps. A first mip map being a 32-bit Texel format storing an 8-bit Ambient Occlusion value, and 24 bits storing a Diffuse RGB888 color. A second mip map being a 32-bit Texel format storing an 8-bit Glossiness value, and 24 bits storing a Specular RGB888 color. A third mip map being a 32-bit Texel format storing an 8-bit Height value, plus 24 bits storing a Normal Vector value in XYZ888 format. Embodiments rearrange these types of parameters into mexels, which can be defined as multiplexed parameter texels.

Embodiments of CF perform calculations in the AYCrCb8888 format. More specifically, instead of a radical modification of the current GPU hardware, this is mostly just a reinterpretation of the input and output data, as the internal hardware is designed to take in any generic 4-channel color, rather than enforcing any particular format. Embodiments store textures in YCrCb format instead of RGB; lighting parameters sent with each rendered triangle are in YCrCb format instead of RGB, and the result of Rendering is a framebuffer write of YCrCb pixels (or AYCrCb if Alpha is needed) instead of RGB pixels (or ARGB). Advantageously, embodiments perform calculations of Cr and Cb channels at around ¼th rate, versus Y rate (or AY rate) for roughly-equivalent perceived quality. I.e., the Cr/Cb channels are roughly ½ resolution in both the X-direction and Y-direction (this is not Y as in luma, but Y as in direction) in the framebuffer.

Furthermore, embodiments utilize "mexels." A mexel can be defined as a "multiplexed parameter Texel", which for PBR, multiplexes parameters disparate in the prior-art into parameters multiplexed together, in order to separate the processing into high-resolution mexels and low-resolution mexels. The higher-resolution mexels contain luma and similar parameters that need the full resolution processing for good image quality. The lower-resolution mexels contain chroma and similar parameters that can get away with quarter (or similar) resolution processing, while still maintaining good image quality.

For the given PBR Texturing example, one way to rearrange the texels into mexels would be: one full-resolution 32-bit texture for DiffuseY, SpecularY, Glossiness, and AmbientOcclusion, one quarter-resolution 32-bit texture for DiffuseCr, DiffuseCb, SpecularCr, SpecularCb, and one full-resolution 32-bit texture for Height, and NormalX, NormalY, NormalZ.

This results in some important gains allowing the Cr/Cb color channel processing to require roughly ¼th the bandwidth, internal calculations, and storage requirements. So, for a given amount of macro-sized external memory bandwidth and internal chip gate count, we get significantly faster performance (since the 32-bit internal pipeline normally does all calculations full-resolution in ARGB format, but now we can compute AY in full-resolution, and CrCb in roughly quarter-resolution). More specifically, embodiments allow for significant reduction in texture storage requirements, because one of these 3 textures can be ¼th resolution, for usual cases.

Embodiments allow for parameters disparate in the prior art into mexel parameters that may be multiplexed together, in order to separate the processing into higher resolution mexels and lower resolution mexels, which may be stored in the same or adjacent memory location. More specifically, higher-resolution mexels including luminance data and similar parameters need full resolution processing for good image quality. However, lower resolution mexels including chrominance data and similar parameters may be processed with lower resolution processing, while maintaining sufficient image quality. By storing and processing the chrominance data at lower resolution while processing higher resolution data in parallel, one may increase the processing speeds while decreasing the storage requirements of the mexels.

CF Rendering minimizes macro-bandwidth usage, and minimizes internal calculations, for many types of textured rendering paradigms. However, the specific case of "multi-texturing with common U, V values" is where CF Rendering really shines due to several optimizations. Specifically, chrominance data may be processed with one quarter resolution while luminance or similar parameters may be processed at full resolution. This may drastically reduce the bandwidth and internal calculations while obtaining faster performance.

An example case for this overview of CF Rendering consists of 3D Graphics Rendering using PBR textures. Similarly, CF Rendering can optimize any multi-texturing paradigm, where the textures involved can share U, V coordinates.

A prior-art system may transfer and process data in the ARGB8888 (8 bits of Alpha (usually used for some sort of transparency effects), 8 bits of Red, 8 bits of Green, 8 bits of Blue) format. This is at external interfaces (ARGB8888 textures and lighting parameters coming in, and ARGB8888 color values written into the framebuffer). Internally, these values undergo computations in a floating-point format (usually normalized to be in the 0.0 to 1.0 range)

Embodiments may store and use textures in YCrCb (also AYCrCb, if Alpha is needed) in a "Mexel Map", instead of the prior-art Mip Map for storing the textures in a pyramidal format. This is to reduce cache-low-hit accesses, and to facilitate processing different parameters at different rates, among other advantages.

Furthermore, embodiments achieve significant reduction in texture storage requirements, because one of the 3 textures can be ¼th resolution, for usual cases. Another novel aspect of the Mexel Map (versus the prior-art Mip Map) storage of textures is that we multiplex in resolution, as well as in parameters. This is to avoid new cache-low-hit accesses that may be introduced if we use the old Mip Map format while reading in full-resolution Y and quarter-resolution CrCb.

To this end, CF Rendering conceptually runs in 2 stages: the luma stage, and the chroma stage, running in parallel. The luma stage runs in full-resolution, while the chroma stage can run in quarter-resolution. The luma stage does the full-resolution calculations and stores Y (or AY) in the framebuffer. Then, or in parallel, the GPU transmits "chroma fracts of information" to the chroma stage, which can be buffered with a FIFO (first-in-first-out or similar data structure). The FIFO smooths out the mismatching processing rates between the luma stage and the chroma stage. Embodiments define a "luma group" as the luma (and similar full-resolution parameters) parts of pixel data which corresponds a single chroma (and similar low-resolution parameter) parts of pixel data. If chroma resolution is one quarter that of luma resolution, the luma group will have 4 luminances per chrominance. If chroma resolution is one sixth that of luma resolution, the luma group will have 6 luminances per chrominance.

In embodiments, a "chroma fract" (or simply "fract") can be defined as a "fractional part of a luma-group-of-pixels, containing lower-resolution-rendered-type of parameters (usually related to chroma)." There is a "fract mask" that defines which fractional part of the luma-group this particular fract is matched with. E.g., for the chroma-quarter-resolution example, the fract mask corresponds to between 1 and 4 luma values. So the fract corresponds to chroma (and similar parameters) for 1, 2, 3, or 4 luma values. In embodiments, a "fract" is dissimilar to the prior-art notion of a group of pixels, because it contains only 2 of the color channels (Cr/Cb), and one fract is usually associated with a subset of 4 luma and 4 Z-buffering Z values. Thus it is a novel notion.

In embodiments, the approximate quality of rendering chroma at quarter-resolution maintains high quality for the majority of on-screen pixels. This includes pixels at the insides of triangles. However, there are technical reasons (primarily aliasing) why the perceived high quality breaks down somewhat for the edges of some of the triangles. While the quality breakdowns tend to be second-order due to the relative insensitivity of the human eye-brain system for chroma, some extra processing in terms of "fract anti-aliasing" can perceivably improve quality for these "troublesome triangle edge cases". Embodiments of CF Rendering includes a proposal, easily implementable in parallel GPU hardware, for "fract anti-aliasing". While this one proposal is presented here as an efficient example, there are many "anti-aliasing" techniques well known in the industry, and CF Rendering is not limited to any one anti-aliasing scheme.

This "fract anti-aliasing" is different than the pixel (or sub-pixel) based anti-aliasing in the prior art. Firstly, this is anti-aliasing at a fract-level, rather than a pixel- or subpixel-level, using different fract-based parameters. Secondly, this is an anti-aliasing stage separate (and usually in front of) the pixel-based anti-aliasing. I.e., common implementations may do the fract anti-aliasing, then in a separate stage, do pixel-based anti-aliasing on top of this.

The example case just described using PBR Textures is expected to be the most common usage of CF Rendering in the future. However, there are compelling needs to support older texturing methodologies (predating PBR). The reasons for this are:

there are older legacy video games that have not yet switched over to PBR.

mobile platforms (phones and tablets) have very little disk space or system memory, compared to desktops and laptops. For such platforms, a video game maker may decide to have just one texture mapped to an object (instead of the several needed for PBR), just to save disk or memory space. There are features of CF that may have some advantages in storage and performance for these "legacy texturing" cases (which can be considered "degenerate multi-texturing cases"). However, the advantages may not be as great as in the PBR (or similar multi-texturing) case.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
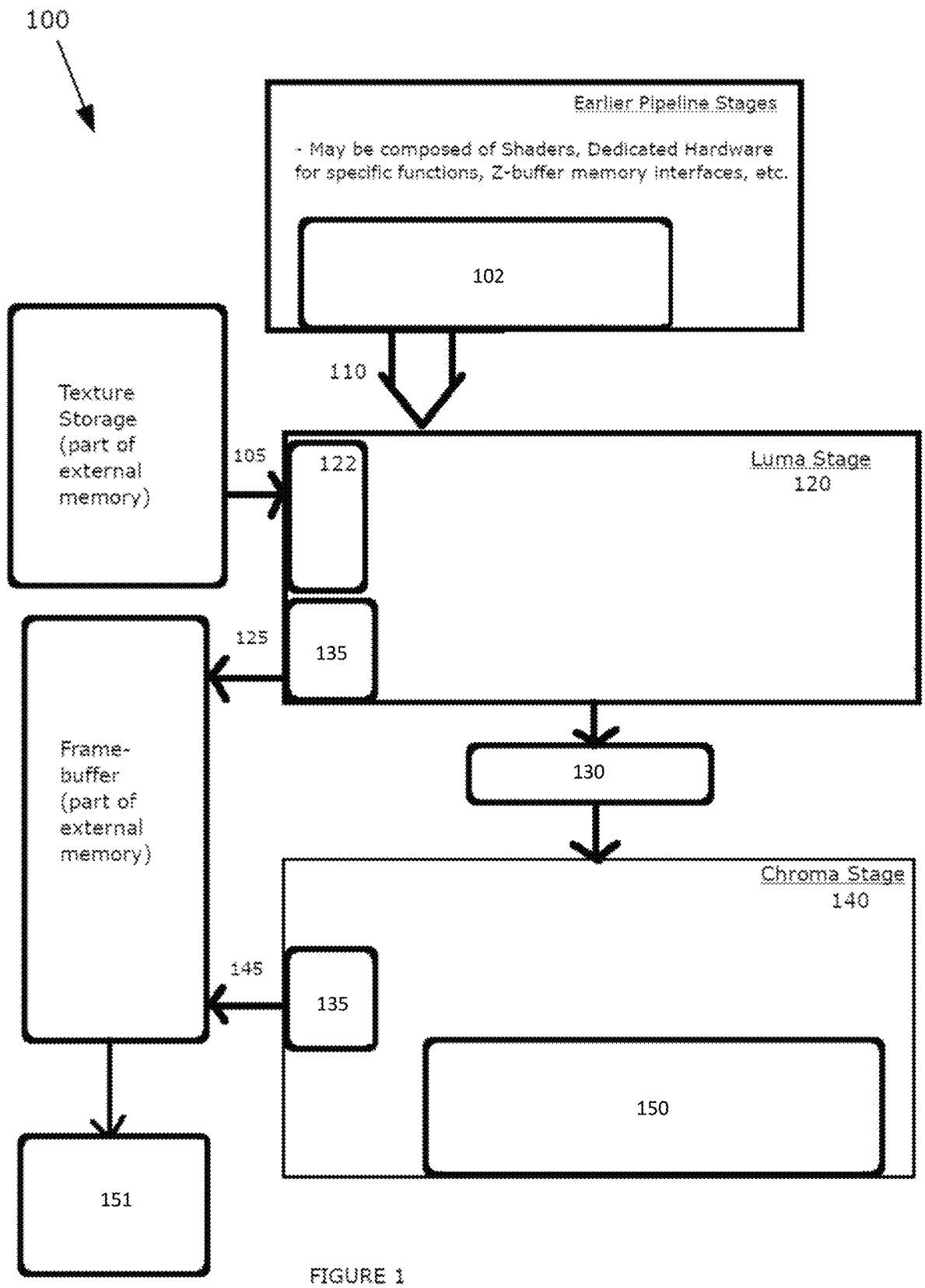
FIG. 1 depicts a two-stage system 100 for 3D graphics texturing and rendering, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments described hereinafter are directed towards 3D graphics texturing and rendering. Embodiments are directed towards chroma fract rendering (referred to hereinafter as "CF"), which encompasses multi-resolution rendering, multiplexing of disparate parameters that are normally stored separately, and utilizing multi-texturing that share common U, V values. In embodiments, data from earlier 3D rendering stages may be received, including a fract mask (added as a parameter from the GPU Rasterizer stage), lighting parameters, textures, U, V, D, coordinates, etc. Using read in mexel data, the luminance stage of CF may calculate a luminance part of the lighting equation, package parameters for Fract Data and write into a Fract FIFO, and write out Y portion of the output pixel into a frame buffer. Then, during a chrominance stage that may operates in a parallel to the luma stage, using the Fract data, the chroma part of the lighting equation may be calculated, and the Cr/Cb portion of the output pixel into the framebuffer.

Turning now to FIG. 1, FIG. 1 depicts a two stage system 100 for 3D graphics texturing and rendering, according to an embodiment. Embodiments may be directed towards a system where all calculations are completed in the AYCrCb8888 format. Instead of a radical modification of current GPU hardware, embodiments are directed towards reinterpretation and managing of the input and output data between a texture storage portion of external memory, a processor, and a frame buffer. This allows textures to be stored in YCrCb format instead of a RGB format, lighting parameters sent with each rendered triangle are in a YCrCB format instead of a RGB format, and the result of rendering is a framebuffer write of YCrCB pixels (or AyCRCB if Alpha is needed) instead of conventional RGB pixels. This allows calculations of Cr and Cb channels at ¼th the rate versus a Y rate for roughly equivalent quality. Specifically, the Cr/Cb channels are roughly ½ resolutions in both the X-direction and the Y-direction in the frame buffer.

Accordingly, at step 110, data from earlier 3D rendering stages may be sent to a processor, including Fract masks. Additionally, the texture storage part of external memory may be accessed at step 105. This received and accessed data may be processed at step 120, which is a luminance stage. Then, a Fract FIFO step 130 may occur, followed by a chrominance step 140.

At step 120, the luma stage runs in full-resolution, while the chroma step 140 can run in quarter-resolution. The luma stage does the full-resolution calculations and stores Y (or AY) in the framebuffer. We define a "luma group" as the luma (and similar full-resolution parameters) parts of pixel data which corresponds a single chroma (and similar low-resolution parameter) parts of pixel data.

At step 120, using read in mexel data, the luminance part of the lighting equation may be calculated, parameters for fract data may be packaged and sent to the FIFO in step 130, and the Y portion of the output pixel may be sent into the frame buffer at step 125.

More specifically, in embodiments, a "chroma fract" (or simply "fract") can be defined as a "fractional part of a luma-group-of-pixels, containing lower-resolution-rendered-type of parameters (usually related to chroma) and other novel data (including a Fract Mask, Fract Anti-aliasing Enable, etc.)". There is a "fract mask" that defines which fractional part of the luma-group this particular fract is matched with. E.g., for the chroma-quarter-resolution example, the fract mask corresponds to between 1 and 4 luma values. So the fract corresponds to chroma (and similar parameters) for 1, 2, 3, or 4 luma values. In embodiments, a "fract" is dissimilar to the prior-art notion of a group of pixels, because it may only include 2 of the color channels (Cr/Cb), and one fract is usually associated with a subset of 4 luma and 4 Z-buffering Z values, and other parameters. Thus it is a novel notion. Embodiments require the fract-mask because the rendered 3D triangles are drawn with boundaries at pixel resolution. Typically only one chroma is computed for 4 pixels in CF Rendering. If the boundary of the triangle producing that chroma does not cover all 4 pixels, the fract-mask info keeps track of which pixels have that chroma color.

At step 130, the fract data may be buffered in a FIFO (first-in-first-out or similar data structure).

At step 140, utilizing the fract data, the chroma part of the lighting equation may be calculated. The Cr/Cb portion of the output pixel may be written into the frame buffer at step 145. In embodiments, when chroma resolution is one quarter that of luma resolution, the luma group will have 4 luminances per chrominance. If chroma resolution is one sixth that of luma resolution, the luma group will have 6 luminances per chrominance. Similarly, if alpha-blending is enabled, the framebuffer blending of chroma values based upon alpha value may occur. For this purpose, embodiments may use a single averaged alpha value for the chroma, or multiple alpha values (corresponding to each luma value) for the single chroma value (if that improves perceived quality) within a luminance group.

Figure 10:
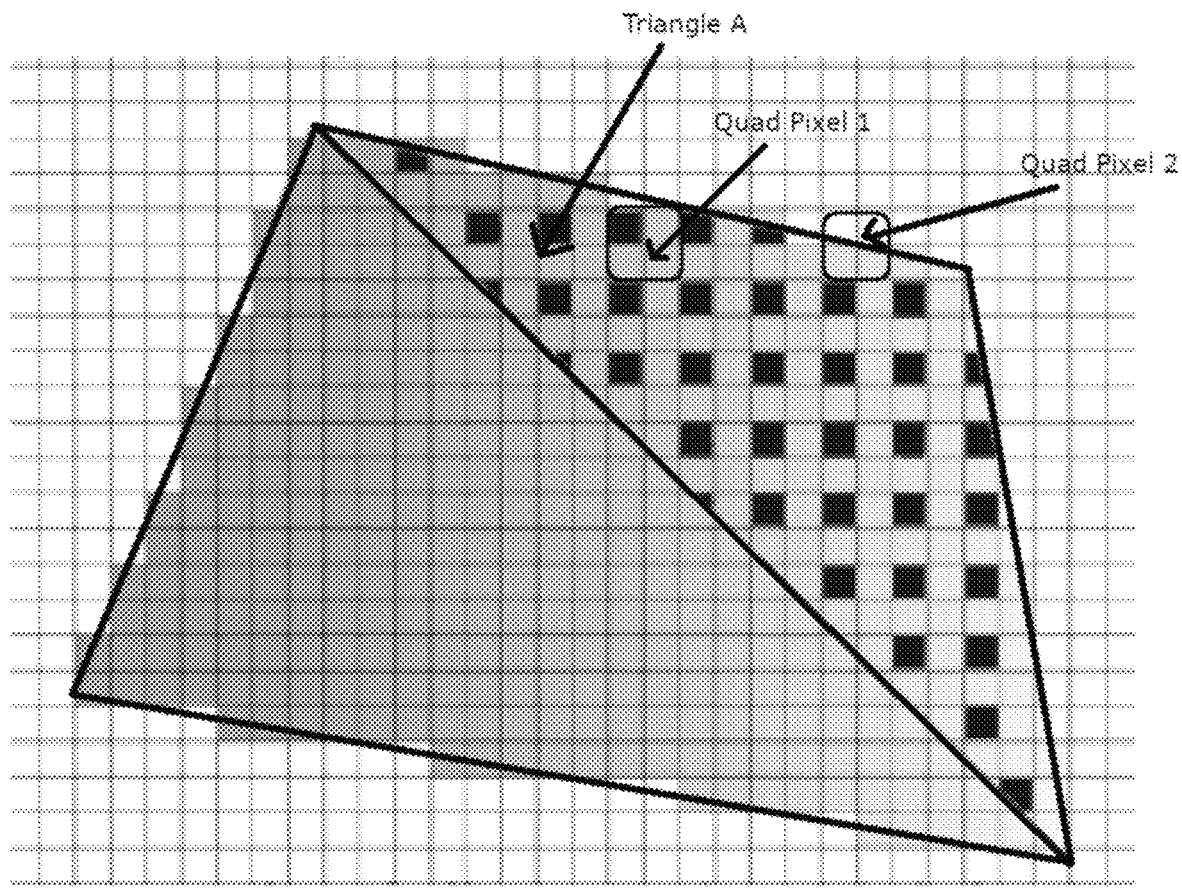
FIG. 10 depicts a chroma-type data generation, according to an embodiment.

More specifically, embodiments may compute chroma at a "quad-pixel center". However, this requires additional interpolations per chroma-type parameter—quality may be good enough to consistently be slightly off in this computation by using the chroma from the upper-left-most pixel, rather than bothering with this additional computation ("upper-left-most rule"). These and other tasks, such as generation of the Fract Mask, are tasks performed by the Chroma-type Data Generator 102. One embodiment is illustrated in FIG. 10. A more sophisticated embodiment of the Chroma-type Data Generator 102 may perform more interpolations of chroma-type parameters, for slightly more accuracy. In either case, the Chroma-type Data Generator 102 is computing or otherwise generating chroma-type parameters at a sampling rate that is lower than for luma-type parameters. In embodiments, the sampling rate for the chroma-type parameters may be one-fourth (at quad-pixel rate) compared to the sampling rate for luma-type parameters (pixel rate). In embodiments, at step 140, the processor packages up all of the needed parameters for each fract into a data structure such as a FIFO (first-in, first-out), and sends them to the chroma stage. The depth of the FIFO should be sufficient so that the 2 parallel-running stages on average do not encounter any significant "bubbles in the pipelines" which would decrease performance. The chroma stage computes the rest of the lighting and other calculations to produce a final chroma color, and stores it in the quarter-resolution chroma part of the framebuffer.

The resulting YCrCb pixel data may be converted into traditional RGB data (for final display on-screen), in a "color space conversion" step. This may be done in a plurality of different ways. Additionally, as the color space conversion is done, it is natural to do some other operations (such as the final steps in Fract anti-aliasing, and Fract alpha-blending). These steps combined form the Colorspace Reversion unit 150 of CF.

Figure 2:
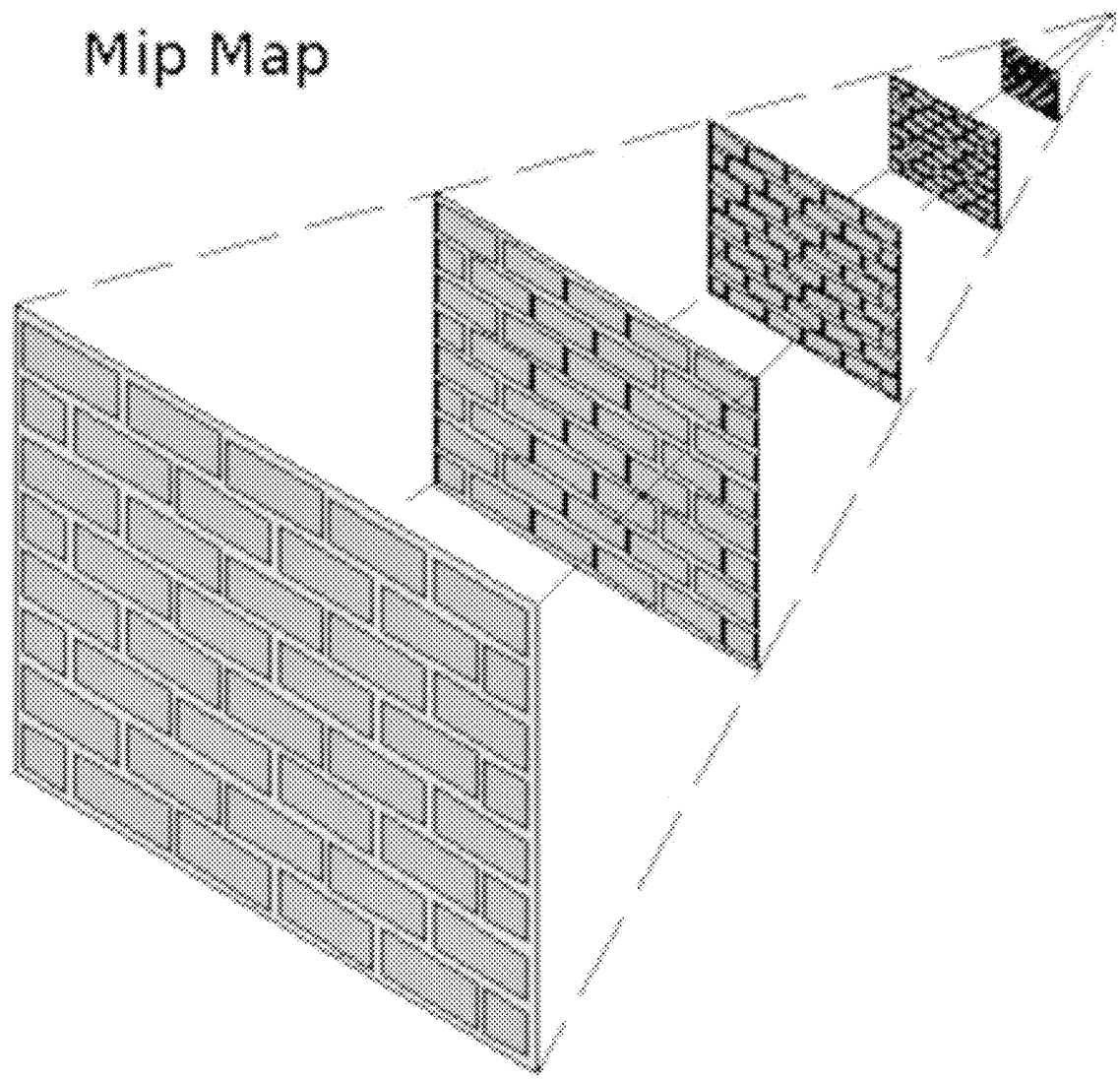
FIG. 2 depicts an embodiment of a Mip Map 200.

FIG. 2 depicts an embodiment of a Mip Map 200. Mip map 200 may be a pyramidal data structure that stores the full texture image at its lowest 205 (most detailed) level. Upper 210, less detailed levels, reduce the resolution in both the U and V directions. Textured pixels (texels) in mip map 200 levels are addressed by U (horizontal) and V (Vertical) coordinate axes. Mip maps 200 have each levels stored where each higher level is quarter-resolution to the level just below it. This is arranged to facilitate "trilinear texture filtering", and "anisotropic texture filtering", which are popular implementations in modern GPUs to produce filtered texture colors for each pixel. GPU's generally read in texture data into a "texture decompressor and cache" 122. Usually, trilinear texture filtering involves one cache-miss, then 3 cache-hits to read the lower 4 texels, then another cache-miss and 3 cache-hits to read the upper 4 texels. That initial cache-miss on accessing a new mip map level often occurs, because the higher-resolution levels in a mip-map tend to be very large in storage requirements (e.g., can be as much as 4096*4096*32-bit storage—much too big to fit inside on-chip caches). In addition, a D coordinate defines which level in Mip Map 200 is being addressed, with D=0 being the most detailed level, D=1 the next most detailed level, etc. Embodiments, described herein store mexels into a different type of format called mexel maps.

Mexels multiplex parameters to facilitate separated luma-type and chroma-type processing. Arranging mexels into traditional mip maps may cause some performance issues, so instead embodiments arrange the mexels into a new format, called a mexel map. There are 2 important types of texturing to consider here: "legacy texturing" and "PBR texturing." PBR texturing should be the norm in the future for high-quality 3D Graphics. In this case, the mexels can be arranged in a traditional mip-map-like format, as Y and CrCb are completely separated into separate mexel maps. The Y mexel map looks exactly like a traditional mip map. The CrCb looks exactly like a traditional mip map, except the most-detailed level will be considered an "orphan" level, in that it can usually be discarded, deleted, or not processed without significant quality degradation (described below). For the PBR texturing case, no other changes are needed for the mexel map, because trilinear (and anisotropic) texture filtering can proceed with these mexel maps with the same number of expected cache misses as traditional mip mapping. However, even if PBR texturing becomes the norm, there will be applications that use the old-style "legacy texturing" that only has one texture mapped to objects (or multi-textures mapped to objects where the multiple textures cannot share their U,V coordinates). It is important to maintain good performance in this second case as well, because "legacy texturing" is expected to be around for some time even if CF is embraced by new GPU designs.

Figure 9:
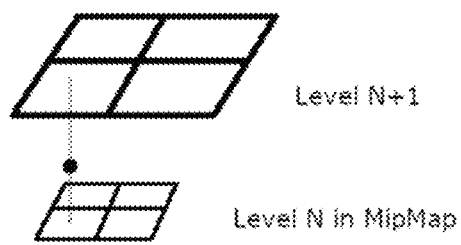
FIG. 9 depicts a non-limiting embodiment of Trilinear Filtering in a Mip Map, according to an embodiment.
Figure 9:
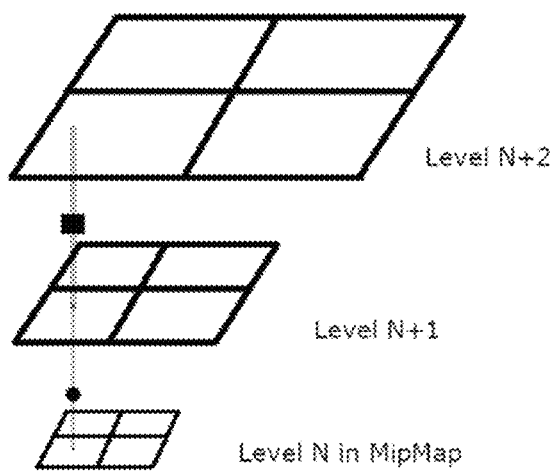

For legacy texturing, however, if embodiments arranged the mexels into mip maps, the fact that embodiments want a lower-resolution version of chroma results in an extra cache-miss for trilinear texture filtering. That is, whereas with RGB textures one would read 2 levels of the mip map to obtain the 8 texels needed for trilinear filtering, with YCrCb mexels, embodiments may require to read 2 levels of the mip map to read Y, and 2 levels that are offset by 1 level (as compared to the Y levels) to read the CrCb. This effectively means reading 3 levels of the mip map for trilinear filtering, thus resulting in the extra cache-miss. This is illustrated in FIG. 9. One extra cache-miss while reading the mexels for trilinear filtering may not seem that bad, but texture mapping reads tend to severely limit GPU performance in realistic scenarios. This is because for trilinear filtering, the GPU typically reads 8 texels (or mexels) per on-screen pixel. This is in comparison to a single Z value read-modified-and-written, and a single final pixel RGB (or ARGB) color written per pixel which are the other per-pixel memory bandwidth requirements. The situation is even more critical for anisotropic texture filtering, as the number of texels read in that case may be several times that of trilinear filtering. Furthermore, many pixels require multiple textures to be used per pixel for the lighting calculations (e.g. PBR Texturing). As such, every one of these cache misses may, in realistic cases, bottleneck the GPU overall performance.

Figure 8:
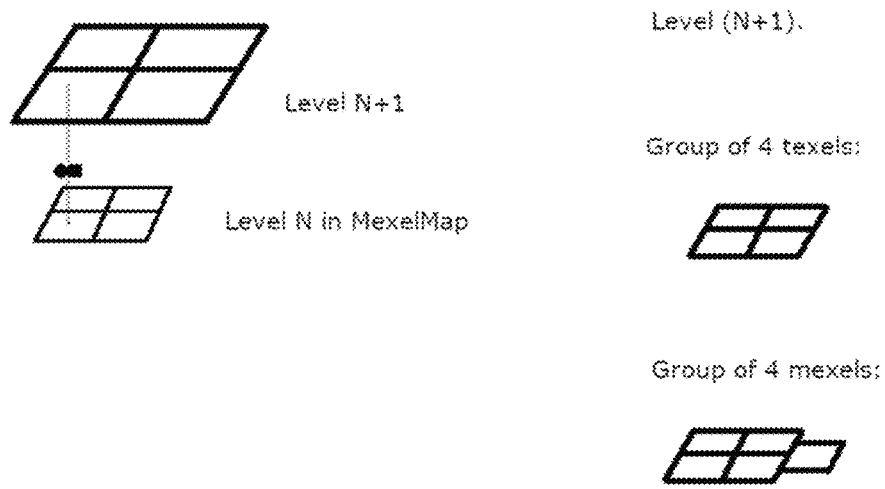
FIG. 8 depicts a non-limiting embodiment of Trilinear Filtering in a Mexel Map, according to an embodiment.

However, embodiments minimize adding additional bandwidth requirements for CF. Accordingly, CF rearranges the mip map into a mexel map, by multiplexing resolution levels for maximum performance for "legacy texturing". Whereas in a mip map you stored the same-resolution R, G, and B into the same mip map level, in a typical mexel map, embodiments for "legacy texturing" store the highest-resolution Y level with the next-to-the-highest resolution Cr/Cb level, multiplexed together. This allows for storing in a Mexel Map level, a higher resolution Y level, with a lower resolution Cr/CB level. This enables mexel trilinear filtering to not have the extra cache-miss, which is present with YCrCb data in the prior-art mip map. This is illustrated by FIG. 8.

Another possibility for a Mexel Map is to replicate all of the higher mip-map levels for AY-type parameters (i.e., high-resolution parameters), and mix them into the one lower mip-map levels (similar to the way embodiments mixed in lower resolution Cr/Cb to the higher resolution Y level). This would possibly result in a "double-headed" Mexel Map (one that contains duplicated upper-levels, i.e., "heads" of the high-resolution parameters). This would, in effect, allow reading a single Mexel Map level to obtain two level's worth of data for AY, which could reduce the number of cache misses. Doing the same "double-headed" treatment on the Cr/Cb side as well, embodiments end up with an overall "quadruple-headed" Mexel Map that may reduce cache misses on the Cr/Cb side. All these "multi-headed" Mexel Maps add additional storage in the Mexel Map, but may increase performance.

Furthermore, mexel maps may reduce needed texture storage memory, by deleting the full-resolution Cr/Cb level ("orphan" level). This may appear to have gross degradation of image quality, but because the human eye-brain system is much less sensitive to chroma the perceived image quality is usually not reduced. In addition, experience with "natural" textures (e.g., photos of natural objects) shows the vast majority of these texture rarely have high frequency chroma info. For example, trees are mostly just subtle shades of green and brown, rocks and dirt are subtle shades of grey or brown, the sky is mostly just white and blue, etc. As such, deleting the "orphan chroma level" generally has imperceptible quality degradation of the majority of real-world textures. Thus, CF makes deleting the "orphan level" optional, and this option can significantly reduce the storage requirements of real 3D Graphics applications, making this another significant benefit. For example, a 256 by 256 mip map storing 32-bits of 4-channel color info would normally take up [(256*256*4 bytes)+(128*128*4 bytes)+(64*64*4 bytes) . . . +(1*1*4 bytes)]=349,524 bytes. An equivalent mexel map that discards the orphan level would only take up [(128*128*4 bytes)+(64*64*4 bytes) . . . +(1*1*4 bytes)] =87,380 bytes. This is a reduction of 75% of the mip map storage. This storage reduction is important, especially for Separate Memory GPUs depicted in FIG. 4, as they use a more expensive type of memory than CPU memory called "video random access memory (VRAM)". The cost of such memory dictates many Separate Memory GPU systems to split products according to how much VRAM they provide (e.g, 4 gigabytes of VRAM systems, 8 gigabytes of VRAM systems, etc.). Any reduction of texture storage results in the smaller-tier VRAM systems to have more functionality. In addition, the smaller memory footprint results in a more efficient Texture Cache 122, so there are implications for better performance as well. Deleting the orphan level can work with either PBR or legacy texturing. A novel aspect of CF is that if you decide to keep the orphan level (possibly slightly higher chroma quality), for "texture magnification" (where you zoom in closer than the highest resolution of the texture on-screen), the GPU hardware may decide to zoom into the orphan level faster than in normal mip-mapping. This zooming in could be as fast as possible, w/o sacrificing smoothness (there should be no noticeable jumps in Cr/Cb). This may result in slightly higher chroma quality.

Figure 3:
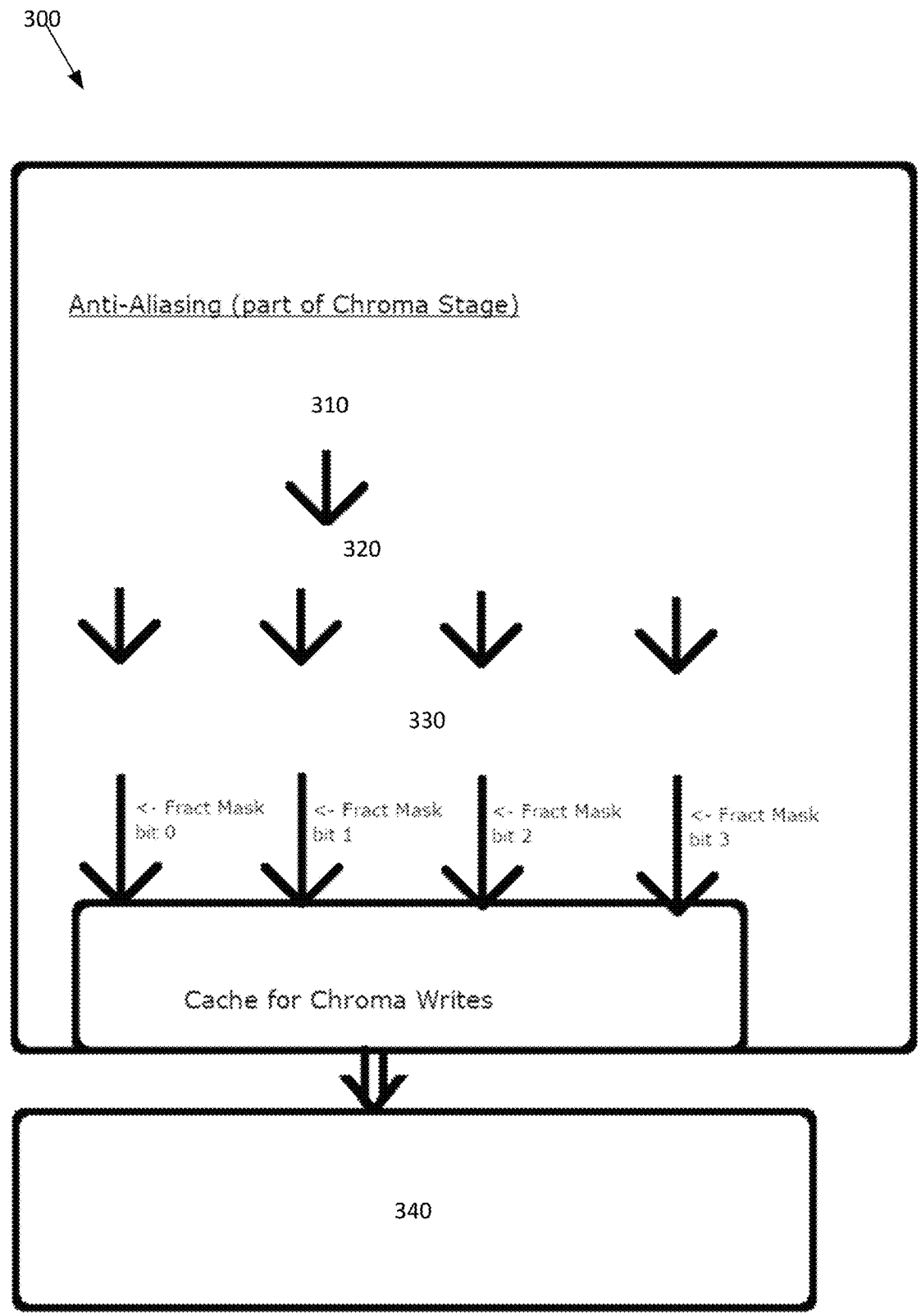
FIG. 3 depicts an anti-aliasing portion of chroma stage 140, according to an embodiment.

FIG. 3 depicts an anti-aliasing portion of chroma stage 140, according to an embodiment. In embodiments, rendering chroma-type data may be completed at approximately quarter-resolution while maintaining high quality for the majority of on-screen pixels. This includes pixels at the insides of triangles. However, there are technical reasons why the perceived high-quality breaks down somewhat for the edges of some of the triangles. While the quality breakdowns tend to be second-order due to the relative insensitivity of the human eye-brain system for chroma, some extra processing in terms of "fract anti-aliasing" can perceivably improve quality for these "troublesome triangle edge cases".

In signal sampling theory, in order to exactly sample an analog signal digitally, the digital sampling rate must be sufficient to sample the highest frequency components of the analog signal correctly. If the digital sampling rate is insufficient for this, embodiments would create false artifacts (called "aliases"), which would be introduced into the digitally sampled signal. The computer screen is, in effect, a digitally sampling medium, using the grid of pixels on the screen. The computer screen can show these "aliases", if rendering 3D Graphics mathematically results in high-frequency components that are too high for the sampling grid of pixels on the screen. Techniques for preventing this "aliasing problem" are called "anti-aliasing" techniques.

Prior-art rendering may use pixel (or subpixel) based anti-aliasing techniques for higher quality. Current embodiments utilize analogous techniques for "fract anti-aliasing", with significant differences in theory and implementation, due mostly to the differences between rendering using pixels versus rendering using lumas and chroma fracts. Specifically, embodiments effectively and efficiently implement the chroma stage and luma stage in parallel GPU hardware, for "fract anti-aliasing". Embodiments may take into account some unique properties of rendering chroma fracts in the chroma stage. Namely, the embodiment's fracts only deal with the chroma-type parameters of a pixel; the luma stage already took care of the luma-type parameters, fracts have the fract-mask info associated with them, and a typical GPU implementation using fracts are very fortunate to have a luma-group's worth of chroma storage in the framebuffer. For example, a common example uses quarter-resolution chroma, as compared to luma. However, the chroma (in CrCb format, e.g.) must at the end be converted (along with the luma) to RGB format, so the framebuffer needs full-resolution RGB in the end.

Accordingly, the GPU would allocate storage as full-resolution Y, plus full-resolution Cr/Cb (but conceptually only ¼th of the Cr/Cb storage is used), which at the end will be converted (during the Colorspace Reversion, described below) to full-resolution RGB. Therefore, even though embodiments conceptually render chroma data at quarter-resolution, the storage is already present for full-resolution chroma. We take advantage of this extra storage in this example fract anti-aliasing. (I.e., this anti-aliasing method does not add any additional memory storage requirements.)

More specifically, embodiments of fract anti-aliasing 300 includes step 310.

At step 310, the chrominance data is computed and rendered in the usual way, except at the end, instead of storing a single Cr/Cb value, we store 1, 2, 3, or 4 Cr/Cb replicated values. This replication of the Cr/Cb values later allows mixing of these values with Cr/Cb values of pixels from future triangles, resulting in higher perceived quality. The higher quality is the anti-aliasing effect, that improves quality for the "troublesome triangle edge cases" (that may otherwise result in objectionable aliasing artifacts).

At step 320, this "replicated storage" is determined exactly by the fract-mask. If the fract-mask contains 1 set bit, then that corresponding memory location is written the replicated Cr/Cb value. If the fract-mask contains 2 set bits, then those corresponding memory locations are written the replicated Cr/Cb values, and so on. In an analogous fashion to "Fract anti-aliasing", which deals with Cr/Cb color values as computed mostly by lighting equations, one may desire "Fract alpha-blending anti-aliasing" as another option. Alpha blending is a common operation in Computer Graphics where the pixel values of the previously rendered framebuffer are blended with newly computed pixel values, according to a blend factor, called Alpha. As an example, for each color channel, a new pixel color is computed as: (COLOR_old*(1−Alpha))+(COLOR_new*Alpha). Such blending is commonly used for transparent-object effects, and simulating the complex edges of foliage and trees. This blending is typically done as a $4^{th}$ "color channel" in the computations (e.g., ARGB format), where Alpha is usually considered to be a luma-type parameter (used at full-resolution, instead of quarter-resolution). CF would alpha-blend the Y luma value (else image quality would suffer), but it's questionable if alpha-blending Cr and Cb needs to be at luma resolution. Again, the human eye-brain system is much less sensitive to chroma, and so one may choose to do chroma alpha-blending at the lower resolution of chroma. However, if one desires slightly higher chroma quality, one may choose to do "Fract alpha-blending anti-aliasing". One embodiment of "Fract alpha-blending anti-aliasing" would work exactly the same way as Fract Anti-aliasing 300, except that instead of replicated/masked writes of Cr/Cb 330, Cr_old and Cb_old values would be alpha-blended with Cr_new and Cb_new values. Note instead of a replicated/masked write, this would involve replication of Cr/Cb, then an alpha-blend (which is a memory read-modify-write operation, rather than a masked write). Thus, "Fract alpha-blending anti-aliasing" can be enabled in CF to further enhance perceived quality. However, this is separate and different than "Fract anti-aliasing". Either one or both techniques can be enabled. If both are enabled, pixels for which alpha-blending is enabled will run as if only "Fract alpha-blending anti-aliasing" is active, whereas pixels for which alpha-blending is disabled will run as if only "Fract antialiasing" is active.

At step 330, without the anti-aliasing we were writing a single Cr/Cb value to framebuffer memory, whereas with the anti-aliasing embodiments are writing up to 4 replicated values. This may appear to require up to 4 times the framebuffer memory bandwidth, but in practice it usually will not require any additional bandwidth. This is because all modern CPU's have a cache to that external memory, and this "replicated write" can be done in a single hardware cycle by making that cache support a "masked, replicated write" capability.

Accordingly, the number of hardware write cycles may be reduced. There are standard, simple designs for memory that supports "masked, replicated write" capabilities. By using this type of memory for the "replicated write", this anti-aliasing runs without any slowdowns compared to running without anti-aliasing. (A design detail is that some slowdown may occur if the memory runs slower due to the "masked, replicated write" capability, but any slowdowns due to that should be small.) Another design detail is that in prior-art GPUs there was a single memory interface for writing these "final pixel color" values into the framebuffer which stored RGB. With CF, because the luma stage writes Y whereas the chroma stage writes CrCb, embodiments may utilize two separate, parallel-running memory interfaces (and corresponding caches) for Y versus CrCb (i.e., a "separate chroma memory interface"). For example, a first cache may be utilized by the chroma stage, and a second cache may be utilized by the luma stage. This may increase performance by having the chroma writes run in parallel with the luma writes. However, in other embodiments, both stages may utilize a single, shared cache.

At step 340, after all rendering is done, embodiments perform the Colorspace Reversion (reverting YcrCb pixel data back to RGB, which is required for scan out to the display screen). If Fract Anti-aliasing (and/or Fract Alpha-blending Anti-aliasing) was enabled, the Colorspace Reversion will also convert the 4 written chroma values to a single value by doing "reconstruction filtering" on these values (and possibly neighboring values). This is standard image processing. A simple (but not highest quality) reconstruction filter is to average these 4 values into a single value. The anti-aliasing occurs because these operations result in image quality similar to rendering the chroma at full-resolution rather than quarter-resolution, then filtering down to quarter-resolution. This effectively increases the sampling rate, and reduces aliasing artifacts.

If Fract Anti-aliasing (or Fract Alpha-blending Anti-aliasing) was not enabled, only one chroma value would have been written instead of 4, so there is no step to convert 4 chroma values to one value. Here Fract Anti-aliasing was described with an anti-aliasing paradigm similar to "multi-sampling", but acting on fracts rather than subpixels. However, there are many other anti-aliasing algorithms. For example, "area-based antialiasing" may produce higher quality, at the cost of adding complexity. If one were to use area-based antialiasing for CF rendering, one would write "tiny Cr/Cb triangle info", for example, rather than "replicated Cr/Cb" color values, and there would be a more complex Colorspace Reversion unit to convert from the "tiny Cr/Cb triangle info" into RGB for displaying. Thus, CF is not limited to any particular, anti-aliasing scheme.

Embodiments may also allow optimization of the Colorspace Reversion. A straightforward, and minimal implementation of CF would be to have a separate step at the end, which converts the pixel data in the frame buffer (from full-resolution luma and lower-resolution chroma) to full-resolution RGB (ready to be displayed on-screen). This step could use the programmable, highly-parallel shaders in all modern CPU's to do this conversion in software.

Because modern GPUs are highly optimized for this type of processing, this extra software step would affect performance by only about a few percent.

Optionally, embodiments could optimize away most of this few percent performance degradation by having a parallel hardware stage to take care of this step (separate Colorspace Reversion stage). Likewise, embodiments could have the display redesigned to accept screen data in YCrCb space, rather than just RGB space, and this Colorspace Reversion step would then be unnecessary for the GPU (monitor-based Colorspace Reversion 151).

Figure 4:
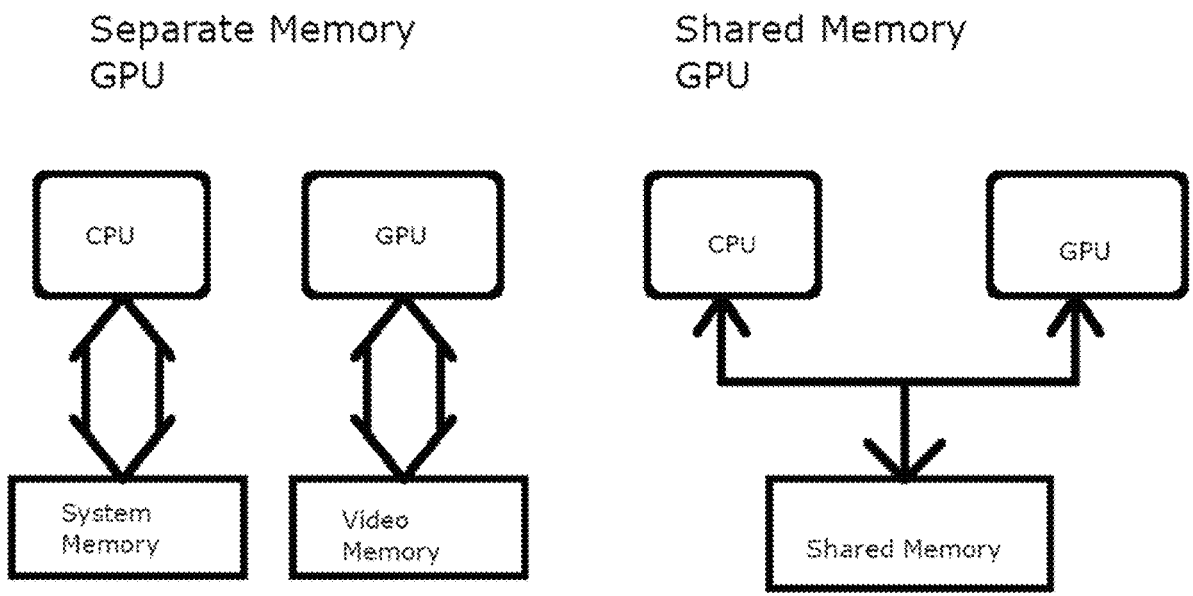
FIG. 4 depicts embodiments of CPU, GPU, system memory, and video memory.

FIG. 4 depicts embodiments of CPU, GPU, system memory, and video memory. As depicted in FIG. 4 bandwidth on a shared memory GPU may be smaller than on a separate memory GPU. Furthermore, because the smaller bandwidth is also shared with the CPU, the available bandwidth is even less. As such, memory-efficient inventions like CF may have greater impacts in shared memory GPU's than separate memory GPU's.

A satellite invention to CF is that the number of pixels in a "luma group" may vary (one may choose 4 in a luma group (chroma rendering at ¼th resolution) or 6 in a luma group (chroma rendering at ⅙th resolution), for example). In addition, this variation may change from tile-to-tile. That is, most modern shared-memory GPUs are "tiled rendering GPUs". They chop up the framebuffer into tiles (typically 16×16 pixels), and render the 3D scene one tile at a time. This requires a "binning" step where all of the triangles of the scene are chopped up into those that fit into each tile, and send them, binned, to each tile as each tile is rendered. This naturally allows some properties of each tile rendering to change, and one could be to change the size of the luma group (and thus increase performance) for some tiles versus other tiles. Many of the detailed techniques described in this invention show example implementations as pertaining to "tiled architecture GPUs", which are the most common. However, the techniques similarly apply to "non-tiled architecture GPUs".

In this scenario, some important-for-quality foreground objects may be in the "higher quality tiles". The higher quality tiles may render with chroma at quarter resolution (i.e., 4 lumas per chroma). In contrast, "lower quality tiles" may be rendered with chroma at one-sixth resolution (i.e., 6 lumas per chroma). One could decide if a tile should be higher quality or lower quality, on a tile-by-tile basis, by determining if the tile is inside a minimum-bounding-box of the high-quality, foreground objects. This could be facilitated by passing a "high-quality-tile" flag in the Fract FIFO. This could result in higher perceived quality, or lower performance cost. This is quite natural to do for "tiled-architecture GPUs", as the already chop up the screen into tiles. Likewise, whether to use the orphan level in a Mexel Map for rendering (slightly higher chroma quality) may be done on a tile-by-tile basis by passing in a "use orphan level" flag in the Fract FIFO. Likewise, one may choose to select tile-by-tile Fract Antialiasing via a "use Fract Antialiasing" flag in the Fract FIFO (or use a similar hardware mechanism for passing data—e.g., registers).

To optimize the bandwidth, CF stores all colors in a color space that separates luma and chroma (YCrCb, YUV, etc.), including intermediate colors, textures, and final pixel values. In addition, whereas in the prior art pixels were stored in a framebuffer where all three R, G, B color channels were full-resolution, CF Rendering stores colors, where luma is in full resolution and chroma is in lower-resolution in both the X and Y directions. This means the luma is stored full-resolution in the framebuffer, and chroma channels are stored (in a typical example) as quarter-resolution (i.e., half-resolution in both X and Y directions) in the framebuffer. This allows CF to store the YCrCb, including both the luminance and chrominance data, to the frame buffer utilizing substantially less data bandwidth due the chrominance data being a quarter resolution. Specifically, the chrominance data is only processed at a fraction (i.e. one quarter) of the resolution that the luminance data is processed. This requires less data to be transmitted between the GPU and the frame buffer associated with the chrominance data than between the GPU and the frame buffer associated with the luminance data, thus reducing the number of hardware write cycles.

Furthermore, performing calculations of the Cr and Cb part of the lighting equation at a lower resolution than the Y resolution reduces the bandwidth required for performing the lighting equation for each pixel without reducing perceived quality.

Moreover, the processing speed of the GPU may be increased by separating the Cr and Cb parts of the lightening equation and running this part in parallel to the higher resolution Y part of the lighting equation.

The basic calculations of bandwidths (and computational work) involved in the prior art rendering, which typically render RGB at full-resolution, can be described as:
R takes 1 "Full Resolution Channel-rendering Bandwidth (and work) (or FRCB)"
G takes 1 "FRCB"
B takes 1 "FRCB"

However, in CF Rendering, we can describe the overall bandwidth (and work) required as:
Y takes 1 "FRCB"
Cr takes ¼ "FRCB"
Cb takes ¼ "FRCB"

Thus, the basic bandwidth (and computational work) advantage of CF over the prior-art is that it takes 1.5 FRCB, versus the prior-art 3 FRCB. Thus, CF can theoretically require ½ the bandwidth (and work) of traditional rendering, and thus can run twice as fast in similar-sized hardware. (This is neglecting the bandwidth requirements for Z-buffering and other details, which are significantly smaller effects.) This is the basic motivation for the CF Rendering invention—it can roughly run at something like twice the speed of prior-art GPUs for common cases.

Descriptions of the non-limiting embodiments of CF in the context of the popular "tiled architecture" GPU follows. A "Stage 1" implementation may perform CF Rendering mostly through software on the very high-performance Shaders, which are the single-instruction, multiple-data (SIMD) computational units that are present in large numbers in modern GPUs. The Shaders provide massively parallel, programmable computational capabilities. In such a simplified implementation of CF, Shader code may provide a software-based Fract Fifo, a software-based Fract Antialiasing, a software-based Colorspace Reversion, etc. This is possible and also could still be high-performance because of the massive parallelism of Shaders, and the external memory bandwidth optimizations of "tiled architectures". In particular, most rendering paradigms with a "tiled architecture" do all of the calculations except for the final write of ARGB data to an external-memory framebuffer, as "sub-passes".

These "sub-passes" are calculations done by the Shaders (on 4-channel color data, such as ARGB, AYCrCb, or any other 4 parameter values), using hardware registers and on-chip "tile memory" 135. The on-chip "tile memory" 135 contains enough memory to do all the rendering for a corresponding tile in the external-memory framebuffer, plus some general-purpose extra space. In essence, the on-chip "tile memory" 135 acts like a cache to speed up reads and writes, compared to doing operations on the corresponding external-memory framebuffer tile. As such, most "tiled architecture" rendering algorithms do everything with Shaders reading/writing the on-chip "tile memory" 135, and just do a final write of ARGB data to the external-memory framebuffer.

In this context, the "Stage 1" CF implementation may still run with high performance, because all of the extra steps in CF, as compared to prior-art, may be done as extra "sub-passes" on the on-chip "tile memory", which are generally fast operations not involving external memory bandwidths.

A "Stage 2" CF implementation may conceptually run similarly to Stage 1, except that one or all of the extra steps in CF may be implemented in hardware. This should generally improve performance compared to Stage 1, by having parallel hardware for Fract Fifo, Fract Antialiasing, Colorspace Reversion, etc. In addition, a Stage 2 implementation may have a separate external-memory framebuffer interface for luma-type data and for chroma-type data, for more parallelism.

A "Stage 3" CF implementation may be similar to Stage 2, except for the addition of additional hardware to support "degenerate multi-texturing" cases. Here "degenerate multi-texturing" cases may refer to rendering triangles which have only 1 (or a few) textures associated with rendering each pixel of the triangle (e.g., "legacy texturing" for old games). Modern high-quality rendering uses PBR texturing as a de facto standard, and the (usually 3) textures associated with this methodology works well in separating its parameters into the luma-types and chroma-types. The chroma-type parameters are processed at a lower resolution for performance gains in CF. With "degenerate multi-texturing", however, there simply are not enough parameters to efficiently separate into luma-type parameters and chroma-type parameters for separated processing. E.g., if we only have one ARGB texture used on a triangle, then it makes no sense to separate the luma from the chroma, because the 4-channel Shader hardware, in one machine clock, can already process all 4 parameters in parallel. These "degenerate multi-texturing" cases are still worthwhile supporting in CF, as many older games still use these textures (legacy texturing). Also, modern games may choose to use "degenerate multi-texturing" for background objects and the like, where quality can be lowered.

A "Stage 2" CF implementation may still improve performance and external memory storage requirements for "degenerate multi-texturing" cases, for example, due to the benefits of the Mexel Map—in particular, the ability to throw out the "orphan level". However, much more optimization for "degenerate multi-texturing" can be provided in a "Stage 3" implementation of CF, with the addition of "half-width optimization". The "half-width optimization" would optionally reduce the SIMD (single-instruction, multiple-data) operation of the Shaders (or some parts of the Shaders) to run half-wide data (i.e., 2 color channels instead of 4) twice as fast. This isn't difficult to do conceptually—simply add control logic to have the option of running the traditional 4-channel pipeline to run two 2-channel pipelines in parallel instead. Such an optimization will, e.g., allow a single-textured triangle to be separated into luma-type (usually AY) and chroma-type (usually CrCb) parameters, and if the pipeline runs twice as fast handling these 2-channel parameters, the full benefits of CF Rendering can occur. As such, Stage 3 is a more complex implementation that handles "degenerate multi-texturing" cases in a better way.

Another implementation detail is regarding compatibility for old video games. A new implementation of CF in a video game would send triangle parameters in a color space that separates out luma and chroma, such as the YCrCb color space. However, practical implementations would prefer to optionally support legacy games that send down parameters in the prior-art ARGB space. A conversion to AYCrCb space can be done by the GPU Driver software, or GPU hardware, on triangle parameters, textures, etc.

A significant detail for this "backwards compatibility" mode is that typical sub-passes in a tiled-architecture rendering involves two groups of operations. Group A would do the bulk of the 3D rendering, up through writing "final rendered" color values to the on-chip tile buffer. Group B would then take this data and do various "post-processing" operations (2D image-processing types of operations, such as stretching from a lower resolution to a higher resolution, bloom, fog, some types of pixel anti-aliasing, motion blur, etc.). For "backwards compatibility", this Group B set of operations expects data in ARGB format. As such, for this case, CF Rendering may do an automated injection of "Colorspace Reversion" in between the Group A and Group B operations. This (as well as an automated color space conversion of textures and triangle parameters) may let a legacy game run without code changes in this "backwards compatibility" mode for CF. This "backwards compatibility" mode could be commercially valuable.

For simplicity in explanation, CF has been described mostly in the context of a "Forward Rendering (or Immediate Mode)" paradigm, which does the complex lighting calculations earlier in the GPU pipeline. However, another popular 3D Graphics paradigm is "Deferred Shading", which defers the complex lighting calculations until later in the GPU pipeline and does intermediate calculations using different parameters than Forward Rendering. CF works similarly in a Deferred Shading paradigm as for Forward Rendering, even though there are many tiny differences in details. For brevity, a detailed description of Deferred Shading is not included here.

Figure 5:
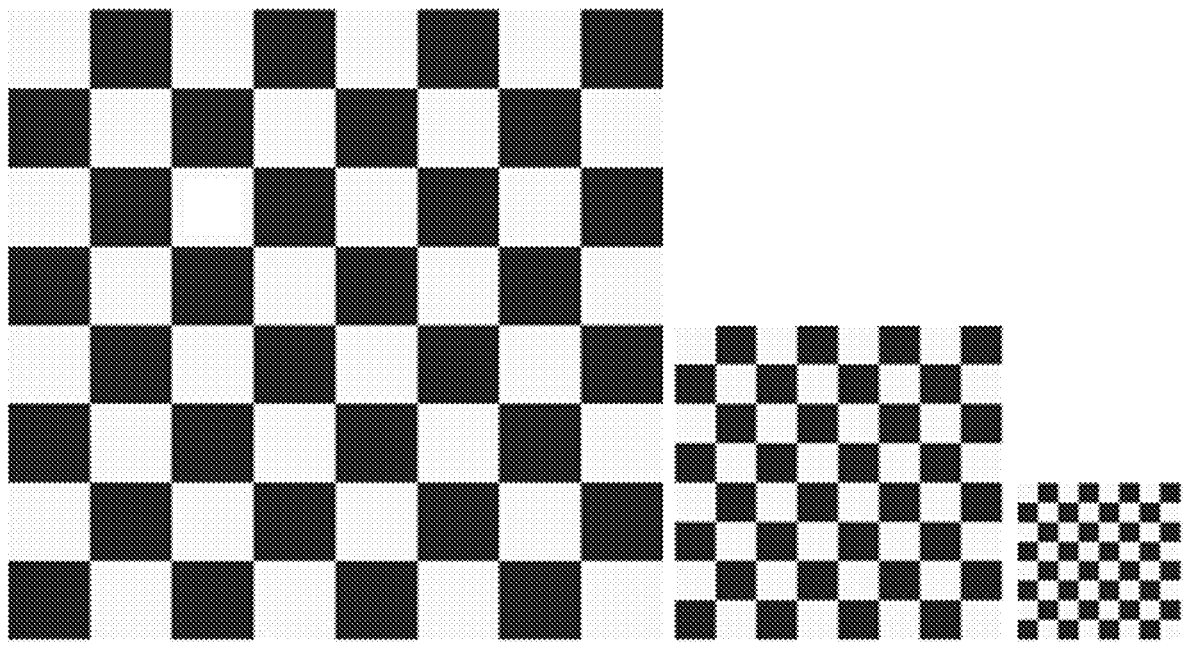
FIG. 5 depicts a PBR Mip MAP and a Mexel A representing Texel A in a mexel/mexel-map format, according to an embodiment.

FIG. 5 depicts a PBR Mip Map and a Mexel A representing Texel A in a mexel/mexel-map format, according to an embodiment.

Figure 6:
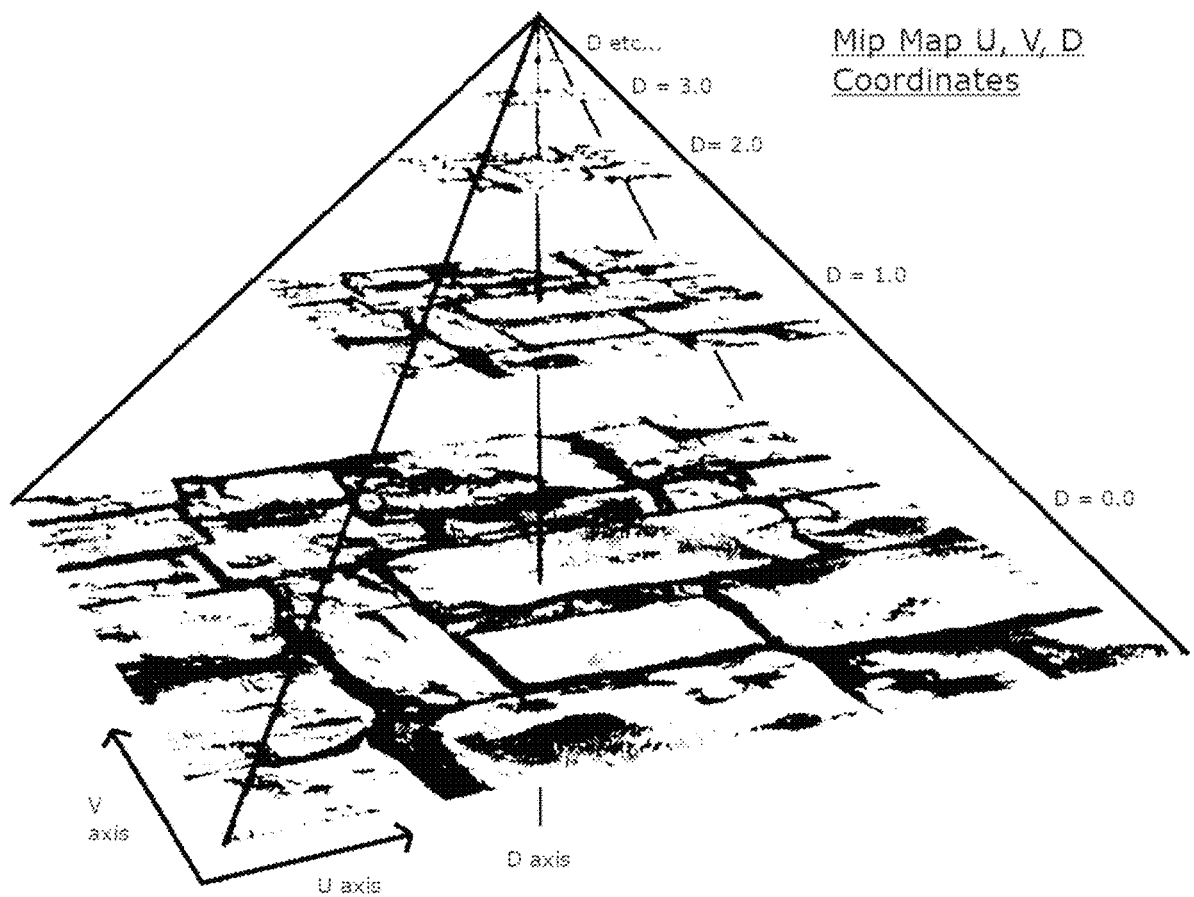
FIG. 6 depicts a Mip Map coordinate systems including U, V, and D coordinates and their associated level, wherein each level may have a different resolution, according to an embodiment.

FIG. 6 depicts a Mip Map coordinate systems including U, V, and D coordinates and their associated level, wherein each level may have a different resolution.

Figure 7:
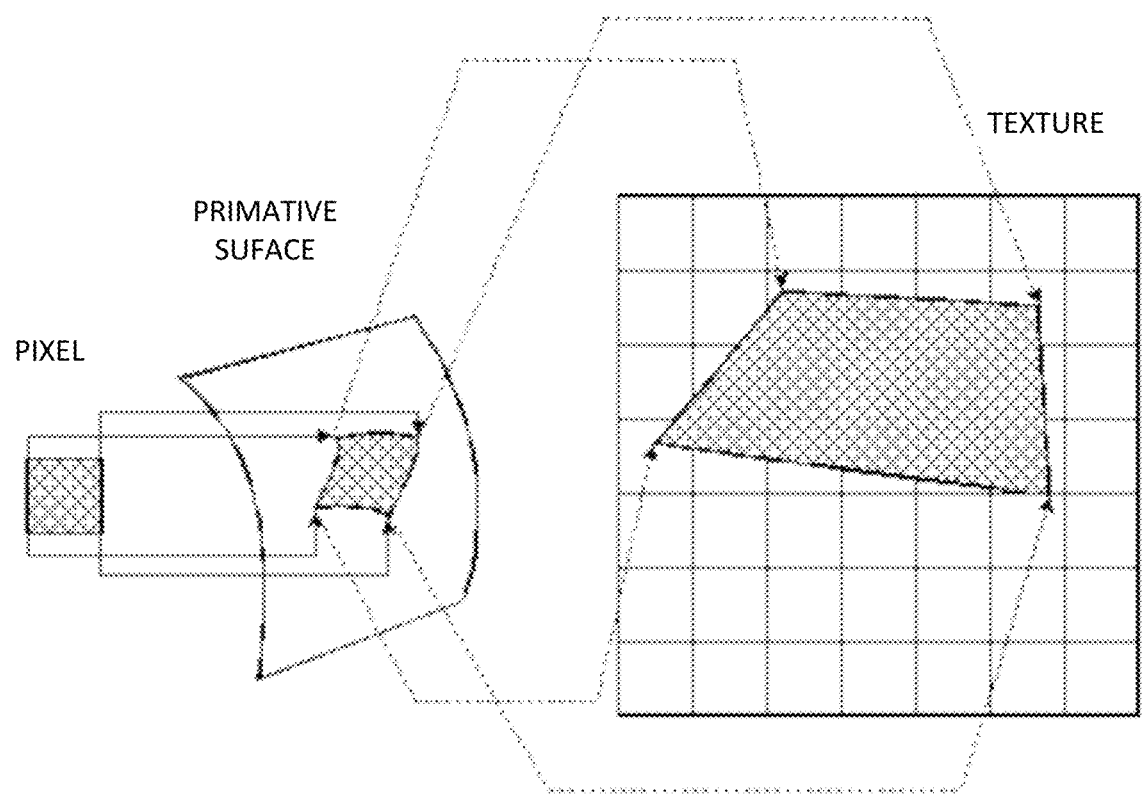
FIG. 7 depicts a non-limiting embodiment of how a pixel extent may map to a texture map, according to an embodiment.

FIG. 7 depicts a non-limiting embodiment of how a pixel extent may map to a texture map. This illustrates why the complex filtering (typically trilinear filtering and anisotropic filtering, for modern GPUs) is needed for going from mip map, or mexel map, data to a color suitable for the lighting equations for a pixel.

FIG. 8 depicts a non-limiting embodiment of Trilinear Filtering in a Mexel Map. More specifically, FIG. 8 depicts YCrCb storage of Mexels in a MexelMap. This may result in the same number of cache misses for tri-linear filtering (or anisotropic filtering) as texels in a Mip Map, while reducing the bandwidth requirements of the system.

FIG. 9 depicts a non-limiting embodiment of Trilinear Filtering in a Mip Map. Specifically, when tri-linear filtering for CrCb, the filtering can occur at one level higher in the Mip Map than that of prior art texels.

FIG. 10 depicts a non-limiting embodiment of chroma-type data generation example.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce a software methodology which implement the function/act specified in the flowcharts and/or block diagrams.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer graphics texturing and rendering method comprising:
   receiving three-dimensional rendering data including luminance data and chrominance data;
   computing a luminance part of a lighting equation for an output pixel utilizing the luminance data at a first resolution;
   transmitting the luminance part of a lighting equation with the first resolution to a frame buffer;
   computing a chrominance part of the lighting equation for the output pixel utilizing the chrominance data at a second resolution, wherein the first resolution is higher than the second resolution;
   transmitting the chrominance part of the lighting equation at the second resolution to the frame buffer;
   forming output pixel data with the chrominance part of the lighting equation at the second resolution and the luminance part of the lighting equation at the first resolution;
   reading texture data corresponding to multiple output pixel extents (preimages) in texture space, wherein a first part being based on the luminance part of an output pixel, and a second part being based on the chrominance part of the output pixel, wherein a chrominance preimage is a different size and shape than a luminance preimage, the chrominance part of the lighting equation being rendered at a lower resolution and a different aspect ratio than the luminance part of the lighting equation, wherein the chrominance part of the lighting equation is rendered separately from the luminance part of the lighting equation.

2. The method of claim 1, wherein the luminance part of the lighting equation is processed in parallel to the chrominance part of the lighting equation.

3. The method of claim 1, wherein the output pixel data is in YCrCb format.

4. The method of claim 3, further comprising:
   converting the output pixel data into RGB data.

5. The method of claim 1, wherein texel data in the mip maps are rearranged into mexel data.

6. The method of claim 1, further comprising:
   forming a mexel map formed of the luminance part of the texture parameters and the chrominance part of the texture parameters, wherein the luminance part and chrominance part are separated.

7. The method of claim 6, wherein the most detailed level of chrominance data in a mexel map is discarded to reduce storage requirements and improve texture cache performance.

8. The method of claim 1, wherein the chrominance part of the lighting equation for the output pixel utilizes chroma fracts, the chroma fracts being a fractional part of a group of pixels the size of a luma group, wherein the luma group includes a plurality of luminance data associated with a single chrominance fract data.

9. The method of claim 1, wherein computing the chrominance part of the lighting equation of the output pixel performs fract-based anti-aliasing.

10. The method of claim 1, wherein computing the alpha-blended chrominance part of the output pixel performs fract-based alpha-blended anti-aliasing.

11. The method of claim 10, wherein reconstruction filtering is done to reduce a plurality of fract-based anti-aliasing chroma values to a single output chroma value.

12. The method of claim 1, further comprising:
    determining a rendered triangle has a single texture associated with rendering each pixel of the triangle, wherein the chrominance data and the luminance data are not split;
    reducing the single instruction multiple data operation of a shader to run at half width at twice the speed as full width;
    performing calculations on the chrominance data and the luminance data associated with the rendered triangle at the half width.

13. The method of claim 1, further comprising:
    for tile-based GPU architectures, varying the luma group size, orphan level usage enable, Fract anti-aliasing enable, and Fract alpha-blending anti-aliasing enable, on a tile-by-tile basis.

14. The method of claim 1, further comprising:
    automated injection of Colorspace Reversion as a sub-pass in tile-based GPU architectures, for backwards compatibility in legacy games.

15. The method of claim 1, further comprising:
    a Chroma-type Data Generator that is configured to generate chroma type parameters that are usually sampled at a coarser rate than the luma-type parameter rate, wherein the Chroma-type Data Generator is also configured to generate novel parameters of CF, wherein the novel parameters of CF include the Fract Mask.

16. A computer graphics texturing and rendering method comprising:
    receiving three-dimensional rendering data including luminance data and chrominance data;
    computing a luminance part of a lighting equation for an output pixel utilizing the luminance data at a first resolution;
    transmitting the luminance part of a lighting equation with the first resolution to a frame buffer;
    computing a chrominance part of the lighting equation for the output pixel utilizing the chrominance data at a second resolution, wherein the first resolution is higher than the second resolution;
    transmitting the chrominance part of the lighting equation at the second resolution to the frame buffer;
    forming output pixel data with the chrominance part of the lighting equation at the second resolution and the luminance part of the lighting equation at the first resolution;
    forming a mexel map based on the luminance part of texture parameters and the chrominance part of the texture parameters, wherein the luminance part and the chrominance part are separated; and zooming into the most detailed level for texture magnification for chroma data is at a different rate than mip map texture magnification.

17. A computer graphics texturing and rendering method comprising:
   receiving three-dimensional rendering data including luminance data and chrominance data;
   computing a luminance part of a lighting equation for an output pixel utilizing the luminance data at a first resolution;
   transmitting the luminance part of a lighting equation with the first resolution to a frame buffer;
   computing a chrominance part of the lighting equation for the output pixel utilizing the chrominance data at a second resolution, wherein the first resolution is higher than the second resolution;
   transmitting the chrominance part of the lighting equation at the second resolution to the frame buffer;
   forming output pixel data with the chrominance part of the lighting equation at the second resolution and the luminance part of the lighting equation at the first resolution;
   wherein computing the chrominance part of the lighting equation of the output pixel performs fract-based anti-aliasing, wherein reconstruction filtering is done to reduce a plurality of fract-based anti-aliasing chroma values to a single output chroma value.

* * * * *